United States Patent [19]

Smith

[11] Patent Number: 5,060,693

[45] Date of Patent: Oct. 29, 1991

[54] PROPORTIONING VALVE FOR HYDRAULIC SYSTEMS

[76] Inventor: Roger R. Smith, 7261 Lyons Rd., Imlay City, Mich. 48444

[21] Appl. No.: 695,146

[22] Filed: Apr. 29, 1991

[51] Int. Cl.⁵ .................................... F16K 11/087
[52] U.S. Cl. ........................ 137/625.17; 137/625.23
[58] Field of Search .................... 137/625.17, 625.21, 137/625.22, 625.23, 625.24; 91/466, 470

[56] References Cited

U.S. PATENT DOCUMENTS 3,744,522 7/1973 Haffner ........................ 137/125.17
4,199,007 4/1980 Holmes ........................ 137/625.17

Primary Examiner—Alan Cohan
Attorney, Agent, or Firm—Peter A. Taucher; Gail S. Soderling

[57] ABSTRACT

A proportioning valve for hydraulic systems having a pair of hydraulic motors. The valve has forward and reverse positions and will also provide differential flow to the paired motors when a difference in drive speed is necessary.

1 Claim, 1 Drawing Sheet

PROPORTIONING VALVE FOR HYDRAULIC SYSTEMS

GOVERNMENT INTEREST

The invention described herein may be manufactured, used, and licensed by or for the Government for governmental purposes without payment to me of any royalty thereon.

BACKGROUND OF THE INVENTION

1. Field of Invention

In one aspect, this invention relates to hydraulic systems. In a further aspect, this invention relates to valves for hydraulic system.

2. Prior Art

Hydraulic valves are well known in the art. They provide safe positive flow of hydraulic fluid from a prime mover to various hydraulic devices. It is desirable under certain conditions to have a hydraulic drive system which powers a wheeled or tracked vehicle. Such drive systems must have a differential mechanism to allow different drive rates when the driven vehicle turns a corner. It would be desirable to provide the hydraulic system with a valve which can provide differential driving forces to opposite sides of the vehicle when the vehicle turns a corner.

SUMMARY OF THE INVENTION

The present invention provides a hydraulic proportioning valve suitable for metering the flow of a pressurized fluid from a hydraulic pump to a pair of hydraulic motors which are adapted to drive a vehicle. The valve allows fluid flow which can drive the motors forward or reverse and also can provide differential driving force to the two motors so as to allow cornering.

The proportioning valve has an elongated cylindrical valve body with first and second Y-shaped passages having two arms extending from a stem. The first and second passages extend diametrically across the valve body and are formed with their longitudinal axes at an acute angle.

The valve body has a sleeve circumferentially disposed about the valve body; the sleeve has a plurality of ports positioned so as to communicate with the Y-shaped passages to direct and meter flow from the pump to the motors. The valve body can also be moved coaxially within the sleeve to provide differential flow to the motors.

DETAILED DESCRIPTION OF THE PREFERRED EMBODIMENT

Figure 1:
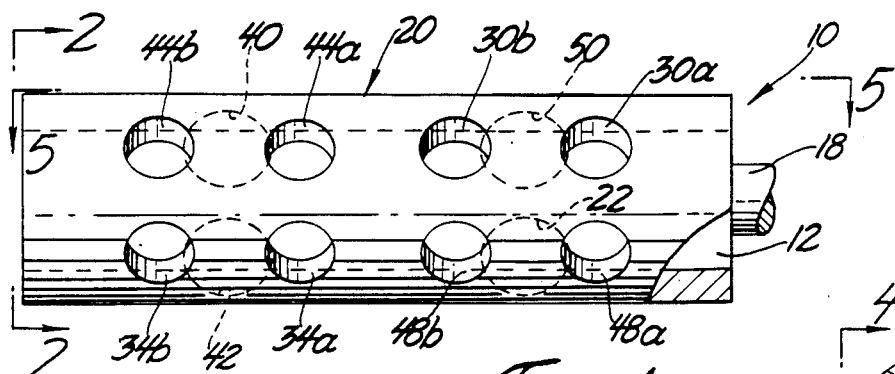
FIG. 1 is a side view of a valve according to this invention.
Figure 2:
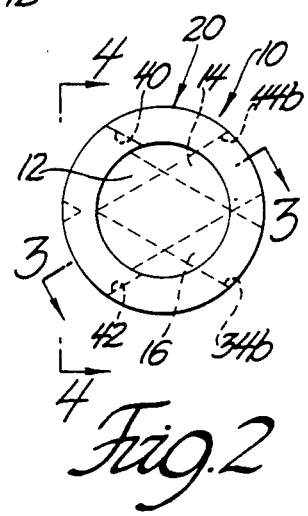
FIG. 2 is an end view of the valve of FIG. 1.
Figure 3:
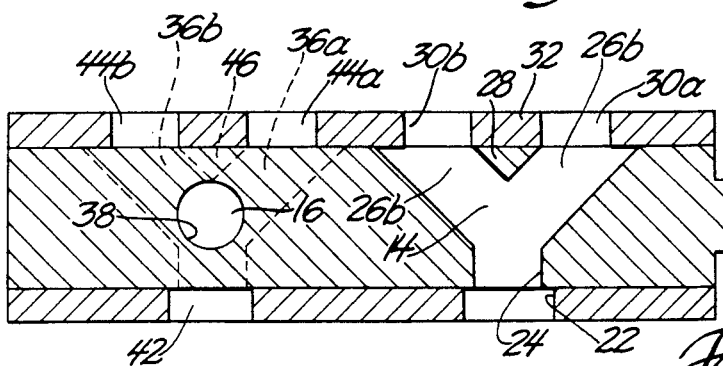
FIG. 3 is a sectional view of the valve FIG. 2 taken along the line 3—3.
Figure 4:
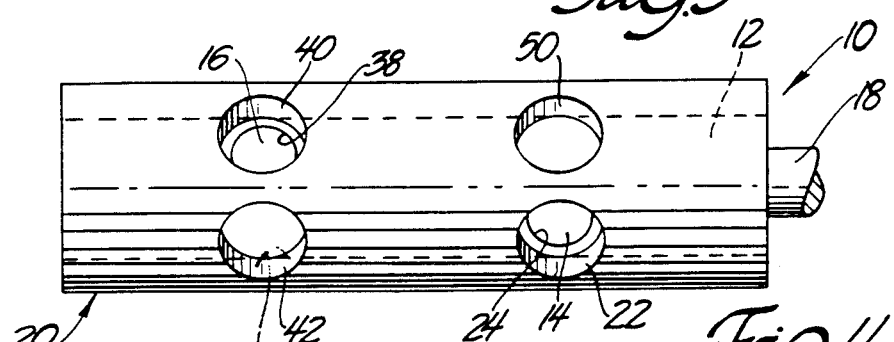
FIG. 4 is a different side view of the valve of FIG. 1.
Figure 5:
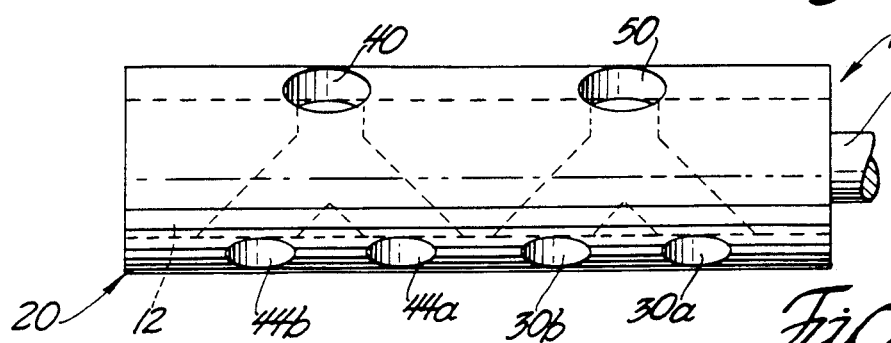
FIG. 5 is a top view of the valve of FIG. 1.

Referring to the accompanying drawing in which like numerals refer to like parts, a portioning valve according to this invention is designated generally as 10. The valve 10, has an elongated cylindrical valve body 12, which in turn has first and second Y-shaped passages designated 14 and 16 respectively formed in the body. The longitudinal axes of the first and second Y-shaped passages 14, 16 are disposed at an acute angle. The valve body 12 is shown with a stem 18 extending longitudinally, the stem being attached to a control means which can rotate the valve body 12 or move it axially along its longitudinal axis to provide differential fluid flow.

The proportioning valve 10 has a sleeve designated generally 20 with a plurality of ports formed in the sleeve to allow flow of hydraulic fluid from a pump, not shown to a pair of hydraulic motors, also not shown. The ports are located so as to cooperate with the Y-shaped passages 14, 16 to operate the motors and sized so as to allow differential driving speeds as will be discussed in detail later. The hydraulic fittings and connections are not shown or described since such connections are within the skill of the art.

The valve 10 will be described in greater detail as being disposed in a drive system where the valve will provide fluid flow to the pair of hydraulic motors so as to drive a vehicle forward or backward and also allow differential drive between the pair of hydraulic motors. Of course, other systems could also be driven such as conveyers and the like.

The valve 10 has a single forward inlet port 22 which is connected to the hydraulic pump, the pump provides a continuous source of pressurized hydraulic fluid for use in driving the motors. The forward inlet port 22 is positioned so a leg 24 of Y-shaped passage 14 can be brought into fluid communication with the forward inlet and sized so it is larger than the inlet port to ensure unimpeded fluid flow from the forward inlet port to the Y-shaped passage. Hydraulic fluid enters the Y-shaped passage at a splitter 28. The fluid in arms 26a, 26b can exit the valve 10 at forward outlet ports 30a, 30b. The arms 26a, 26b are formed larger than the outlet ports so there is unimpeded flow of hydraulic fluid and the splitter is sized so it corresponds in size to the separation portion 32 of the valve sleeve 20. When the valve body is in the equal drive position shown, the base of the splitter 28 and the separation portion 32 correspond allowing equal mounts of fluid to flow through each arm 26a, 26b to the hydraulic motors. This position will drive the motors at the same speed.

A necessary part of any hydraulic system is the fluid return. The present valve has a pair of forward return ports 34a, 34b which are fluidly connected to the discharge side of the hydraulic motors. The forward return ports 34a, 34b are fluidly connected to the arms 36a, 36b of Y-shaped passage 16. Hydraulic fluid entering the arms will flow through Y-shaped passage 16 into its leg 38 exiting the forward pump port 40 which is fluidly connected to a sump which acts as a reservoir for the hydraulic pumps.

In the position shown, the hydraulic fluid will enter the forward inlet port 22 and be divided to flow equally to the forward outlet ports 30a, 30b providing equal flow and equal power to each of the hydraulic motors. To provide differential action the elongated cylindrical valve body 12 is moved axially inside the sleeve. Axial movement will move the splitter 28 so that the base of the splitter will obstruct a portion of one forward outlet. As shown, if the cylindrical valve body 12 is moved to the left as viewed in the drawing, the splitter 28 will partially obstruct forward outlet part 30b while port 30a retains full fluid flow. In this position, the fluid flow differential will provide sufficient speed differential to make for smooth cornering. The arms 26a, 26b in cylindrical body 12 are formed larger than the forward outlet parts 30a, 30b in sleeve 20 so that fluid flow in one of the outlet ports will remain unimpeded when the valve body is moved longitudinally.

An advantage of using hydraulic motors is the ease of operating the motors in reverse. Simply by reversing the flow of hydraulic fluid the motor works in reverse. The present valve has a second set of ports formed in the sleeve which will reverse the flow of hydraulic fluid and thereby drive the vehicle in reverse. As shown, the first Y-shaped passage 14 and second Y-shaped passage 16 have their axes disposed at an acute angle so that rotation of the cylindrical valve body 12 will seal all the ports at an intermediate position and engage a second set of ports in the reverse position. When the valve body is rotated to the reverse position the hydraulic pump will provide pressurized hydraulic fluid to a reverse inlet port 42, the fluid entering the leg 38 of Y-shaped passage 16 and flowing through the Arms 36a, 36b of passage 16. The pressurized fluid will exit via reverse outlet ports 44a, 44b flow into the hydraulic motors driving them in reverse. The valve body 12 can be moved axially and splitter 44 will provide differential fluid flow in the reverse position the same as was described above with respect to forward motion. The fluid is returned to the valve 10 at ports 48a, 48b flows into the passage 14 and exits the valve at port 50 to be returned to the sump.

The foregoing description shows an improved valve structure for controlling a pair of hydraulic motors which allows the motors to be driven forward or reverse and also provides for differential drive between the motors in either the forward or reverse mode.

I wish to be understood that I do not desire to be limited to the exact details of construction shown and described for obvious modifications will occur to a person skilled in the art, without departing from the spirit and scope of the appended claims.

What is claimed is:

1. A proportioning valve for metering and controlling the flow of pressurized fluid from a pump to a pair of hydraulic motors the valve being adapted to provide variable fluid flow to the hydraulic motors and structured so as to allow operation of the motors in a forward or reverse direction, while simultaneously providing the capacity for differential flow to the motors to provide a speed differential between the motors, the valve comprising:

an elongated cylindrical valve body having a first Y-shaped passage with two arms extending from a stem portion, the first passage extending diametrically across the valve body, a second Y-shaped passage with two arms extending from a stem portion, the second passage extending diametrically across the valve body, the first and second Y-shaped passages having their longitudinal axes disposed at an acute angle to each other;

a sleeve circumferentially disposed about the cylindrical valve body the sleeve and body being mounted to so as to allow rotation of the cylindrical valve body between forward and reverse positions with a neutral position in between and longitudinal movement of the cylindrical valve body within the sleeve from a normal centered position to first and second differentiating positions, the sleeve having a forward inlet port connected to the pump, and a pair of forward outlet ports individually connected to the inlet ports of the hydraulic motors, when the valve body is rotated to the forward position, the first Y-shaped passage is brought into alignment with the forward inlet port and forward outlet ports, the forward inlet port is sized to allow full fluid flow into the Y-shaped passage stem at any valve body longitudinal position, the forward outlet ports are formed in the sleeve diametrically opposed to the forward inlet port and are sized to allow the free flow of fluid from the arms of the first Y-shaped passage when the valve body is in the normal centered position but will restrict the flow of pressurized fluid to only one of the forward outlet ports when the valve body is moved longitudinally from the normal position, forward return ports are formed in the sleeve and connected to the outlet of the hydraulic motors, the forward return ports being adapted to feed the fluid flow returning from the motors into the arms of the second Y-shaped passage in the valve body, a forward outlet return port is formed in the sleeve diametrically opposed to the return inlet ports, the forward return port being fluidly connected to a reservoir for receiving the hydraulic fluid, the sleeve having a reverse inlet port connected to the source of pressurized fluid, and a pair of reverse outlet ports individually connected to the outlet ports of the hydraulic motors, when the valve body is rotated to the reverse position the second Y-shaped passage is brought into alignment with the reverse inlet port and reverse outlet ports, the reverse inlet port is sized to allow full fluid flow into the second Y-shaped passage stem at any valve body longitudinal position, the reverse outlet ports are formed in the sleeve diametrically opposed to the reverse inlet port and are sized to allow the free flow of fluid from the arms of the second Y-shaped passage when the valve body is in the normal centered position but will restrict the flow of pressurized fluid to one of the reverse outlet ports when the valve body is moved longitudinally from the normal position, of the hydraulic motors, reverse return ports are formed in the sleeve and connected to the inlet port of the hydraulic motors, the reverse return ports being fluidly connected to the motors inlet so fluid from the motors enters the arms of the second Y-shaped passage in the valve body, a reverse return outlet port is formed in the sleeve diametrically opposed to the return inlet ports, the reverse return port being fluidly connected to a reservoir for hydraulic fluid.

* * * * *